United States Patent [19]
Sanuga

[11] Patent Number: 5,685,385
[45] Date of Patent: Nov. 11, 1997

[54] ELECTRICALLY DRIVEN CART

[75] Inventor: Fumio Sanuga, Akishima, Japan

[73] Assignee: Billcon Corporation, Tokyo, Japan

[21] Appl. No.: 498,414

[22] Filed: Jul. 5, 1995

[30] Foreign Application Priority Data

Mar. 27, 1995 [JP] Japan ................. 7-002379 U

[51] Int. Cl.⁶ ................................. B60K 1/00
[52] U.S. Cl. ................... 180/65.1; 280/DIG. 5; 180/65.6
[58] Field of Search ................. 180/65.1, 65.5, 180/65.6; 280/DIG. 5, 47.24, 47.26

[56] References Cited

U.S. PATENT DOCUMENTS

| | | | |
|---|---|---|---|
| 3,815,699 | 6/1974 | Ganskopp et al. | 280/DIG. 5 |
| 4,427,084 | 1/1984 | Savard, Jr. | 280/DIG. 5 |
| 4,657,100 | 4/1987 | Lewis | 280/DIG. 5 |
| 4,762,193 | 8/1988 | Levine | 280/DIG. 5 |
| 5,109,938 | 5/1992 | Vautelin et al. | 280/DIG. 5 |

*Primary Examiner*—Richard M. Camby
*Attorney, Agent, or Firm*—Finnegan, Henderson, Farabow, Garrett & Dunner, L.L.P.

[57] ABSTRACT

An electrically driven cart driven by an electric motor in which a baggage such as golf bag is carried comprises a body frame, a driving source comprising the electric motor, a drive shaft operatively connected to the driving source, a pair of right and left wheels serving as driving wheels which are operatively coupled to be rotatable to both ends of the drive shaft of the motor, a power transmitting mechanism disposed between the drive shaft and the driving wheels to transmit a power of the motor to the driving wheels through the drive shaft, and a carrier secured to the body frame on which a baggage is rested. The power transmitting mechanism performs a differential motion and comprises a pusher which is provided on the drive shaft to be rotatable therewith and a receiver which is provided on the wheels to be rotatable therewith and comes into abutment with the pusher on their coaxial circumferential paths to receive torque from the pusher, the power transmitting mechanism being provided between the drive shaft and each of the wheels. The power transmitting mechanism provides an allowance for rotation of the each wheel such that the wheel side can rotate through a certain angle in advance of the drive shaft side in an advancing direction of the cart.

14 Claims, 4 Drawing Sheets

ELECTRICALLY DRIVEN CART

BACKGROUND OF THE INVENTION

The present invention relates to an electrically driven cart used as a golf cart or other carrying carts, and more particularly, to an electrically driven cart in which a power transmitting mechanism for left and right driving wheels is improved to provide advantages such as more satisfactory differential motion of the wheels while the cart is making a turn.

Conventional electrically driven carts driven by an electric motor used as golf carts or other carrying carts employ, depending on the purposes of use and the conditions in use, various power transmitting mechanisms in view of required characteristics such as differential motion of the wheels while the cart is making a turn.

In a typical multi-bag carrying electrically driven cart, called merely an electric cart hereinafter, for loading and carrying a plurality of golf bags, for example, a power transmitting mechanism similar to a differential gear assembled in automobiles or the like is employed for driving the wheels. This type of power transmitting mechanism is superior in maneuvability and turning ability, but has disadvantages in that the mechanism is in itself complicated, expensive and heavy. There is also known an electric cart employing a one-way clutch mechanism, which is provided with one-way clutches assembled between a drive shaft and the wheels, allowing the wheels to rotate only in the direction forward which and is employed often in single-bag electric carts. This mechanism is simple in structure and relatively inexpensive, and the electric cart employing such a one-way clutch mechanism has a good turning ability. This type of cart is therefore suitable for use in flat courses, but is dangerous when descending a slope because the one-way clutch mechanism itself cannot act as a brake. Therefore, an additional braking mechanism is required to stop the cart and, hence, the advantage of an inexpensive and simple mechanism is lost.

Another conventional mechanism is the type forcibly slipping a left or right wheel without employing a differential mechanism. In this type of mechanism, using integral drum-shaped wheels, for example, one wheel is slipped so as to serve as a fulcrum while the other wheel is turning. This mechanism is simple in structure, but lawns may be damaged by slipping of one wheel during the turn. Damage on lawns of a golf course is very serious, particularly, on rainy days.

In addition, a mechanism using two motors or two clutches may be theoretically realized. Such a mechanism is intended to provide performance similar to that of a differential gear mechanism by using two motors or two clutches and is expected to have a superior turning ability. However, it is necessary to independently control two motors or two clutches to each other, resulting in more complicated control than other mechanisms. In addition, the use of two motors increases the cost in comparison with the case of using a single motor, and requires a power supply, e.g., a battery, of larger capacity because of increased power consumption.

Thus, conventional electric carts employing power transmitting mechanisms are complicated, heavy and expensive, and hard to control when descending a slope. Also, adequate attention is not fully paid to safety while the cart is moving on undulated ground. Other problems include lawn damage by slipping of one wheel during a turn when the cart is used as a golf cart, a complicated control mechanism is required, and a power supply of a larger capacity is required with an increase in power consumption.

SUMMARY OF THE INVENTION

An object of the present invention is to substantially eliminate defects or drawbacks encountered in the prior art and to provide an electrically driven cart in which a power transmitting mechanism, including a differential mechanism required for turning of the cart, is relatively simple and easy to manufacture, a power supply is reduced in weight, capacity and cost, and superior maneuvability and safety are ensured.

This and other objects can be achieved according to the present invention by providing an electrically driven cart driven by an electric motor comprising:

a body frame;

a driving source comprising the electric motor;

a drive shaft operatively connected to the driving source;

a pair of right and left wheels serving as driving wheels which are operatively coupled to be rotatable to both ends of the drive shaft;

a power transmitting mechanism disposed between the drive shaft and the driving wheels to transmit a power of the motor to the driving wheels through the drive shaft; and a carrier means secured to the body frame on which a baggage is rested, the power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from the pusher, the power transmitting mechanism being provided between the drive shaft and each of the driving wheels, wherein the power transmitting mechanism provides an allowance for rotation of the each wheel such that the wheel side can rotate through a certain predetermined angle in advance of the drive shaft side in an advancing direction of the cart.

In preferred embodiments, after the driving wheels have freely rotated through a certain angle in the advancing direction, the receiver comes into abutment with the pusher for each wheel to thereby eliminate the allowance for an advancing rotation of the wheel.

A ring member is mounted to each of both ends of the drive shaft to be rotatable therewith and the pusher pusher comprises a pin radially projecting from an outer periphery of the ring and wherein a disk is mounted to an inner periphery of each of the wheels to be rotatable therewith and the receiver comprises a projection projecting from an outer peripheral edge of the disk, the projection extending parallel to an axis of the drive shaft and coming into abutment with the pusher in the circumferential direction. The ring and the pin constituting the pusher and the disk and the projection constituting the receiver are respectively formed of a resin material through an integral molding process.

The pair of wheels serving as driving rear wheels and a front wheel is further provided to the body frame as a driven wheel to be capable of changing an advancing direction of the cart.

A rotational shaft extends from the electric motor to be parallel to the drive shaft, and the rotational shaft is operatively coupled to the drive shaft through a speed reduction gear mechanism.

A manually operating handle member may be further attached to the body frame.

Furthermore, according to the present invention, an electrically driven cart driven by an electric motor for carrying a golf bag may be specifically provided, which comprises:

a body frame;

a driving source comprising the electric motor;

a drive shaft operatively connected to the driving source;

a pair of right and left rear wheels serving as driving wheels which are operatively coupled to be rotatable to both ends of the drive shaft;

a front wheel attached to the body frame serving as a driven wheel to be capable of changing an advancing direction of the cart;

a power transmitting mechanism disposed between the drive shaft and the driving wheels to transmit a power of the motor to the driving wheels through the drive shaft;

a carrier means secured to the body frame on which a golf bag is rested, the carrier means being provided with a support member for supporting the golf bag; and a manually operating handle member attached to the body frame, the power transmitting mechanism performing a differential motion and comprising a pusher which is provided on the drive shaft to be rotatable therewith and a receiver which is provided on the wheels to be rotatable therewith and comes into abutment with the pusher on their coaxial circumferential paths to receive torque from the pusher, the power transmitting mechanism being provided between the drive shaft and each of the rear wheels, wherein the power transmitting mechanism provides an allowance for rotation of each of the rear wheels such that the rear wheel side can rotate through a certain predetermined angle in advance of the drive shaft side in an advancing direction of the cart.

With the arrangements set forth above, according to the present invention, the power transmitting mechanism between the drive shaft and each of the driving wheels is of a simple structure comprising the pusher and the receiver. It is thus possible to effectively reduce the number of parts, lessen the body weight, simplify the control operation, facilitate the manufacture, and hence cut down the production cost.

Further, the power transmitting mechanism allows the driven side to rotate in advance of the drive side in the advancing, i.e. forward, direction for each of the left and right wheels. Therefore, when the cart makes a turn under operation, the outer wheel which must rotate in a larger amount than the inner wheel is allowed to rotate in advance of the drive shaft, and differential motion of the left and right wheels required for the turn is easily realized.

As a result, the cart can smoothly make a turn without causing a slip between the wheel and the ground. For an electrically driven cart in which electric power is utilized as assistive power to advance a handcart, the user can easily change the moving direction of the cart without needing any extra force. When the electrically driven cart is used as a golf cart traveling on lawns, differential motion of the rear wheels enables the cart to smoothly make a turn without causing a slip and, hence, a drawback of damaging the lawns is avoided.

When traveling on slopes, the cart can climb an uphill by rotating the wheels through the push type power transmitting mechanisms as with the normal operation. When descending a downhill, the receivers attain a braking action by the arrangements that after the wheels have freely rotated through the certain angle in the forward direction, the receiver comes into abutment with the pusher for each wheel to thereby eliminate the allowance for the forward rotation of the wheel. Therefore, safety is sufficiently ensured even while the cart is traveling on the undulated ground, with a simple mechanism such as a motor brake associated with the motor as a drive source. There is no need of providing specific brake mechanisms on the wheels.

The nature and further features of the present invention will be made more clear through the following descriptions made with reference to the accompanying drawings.

DESCRIPTION OF THE PREFERRED EMBODIMENTS

One embodiment of an electrically driven cart driven by an electric motor, called merely electric cart hereinafter, according to the present invention, will be described hereunder with reference to the accompanying drawings. In the illustrated embodiment, the electric cart is applied, by way of example, as a golf cart for carrying a single golf bag.

Figure 1:
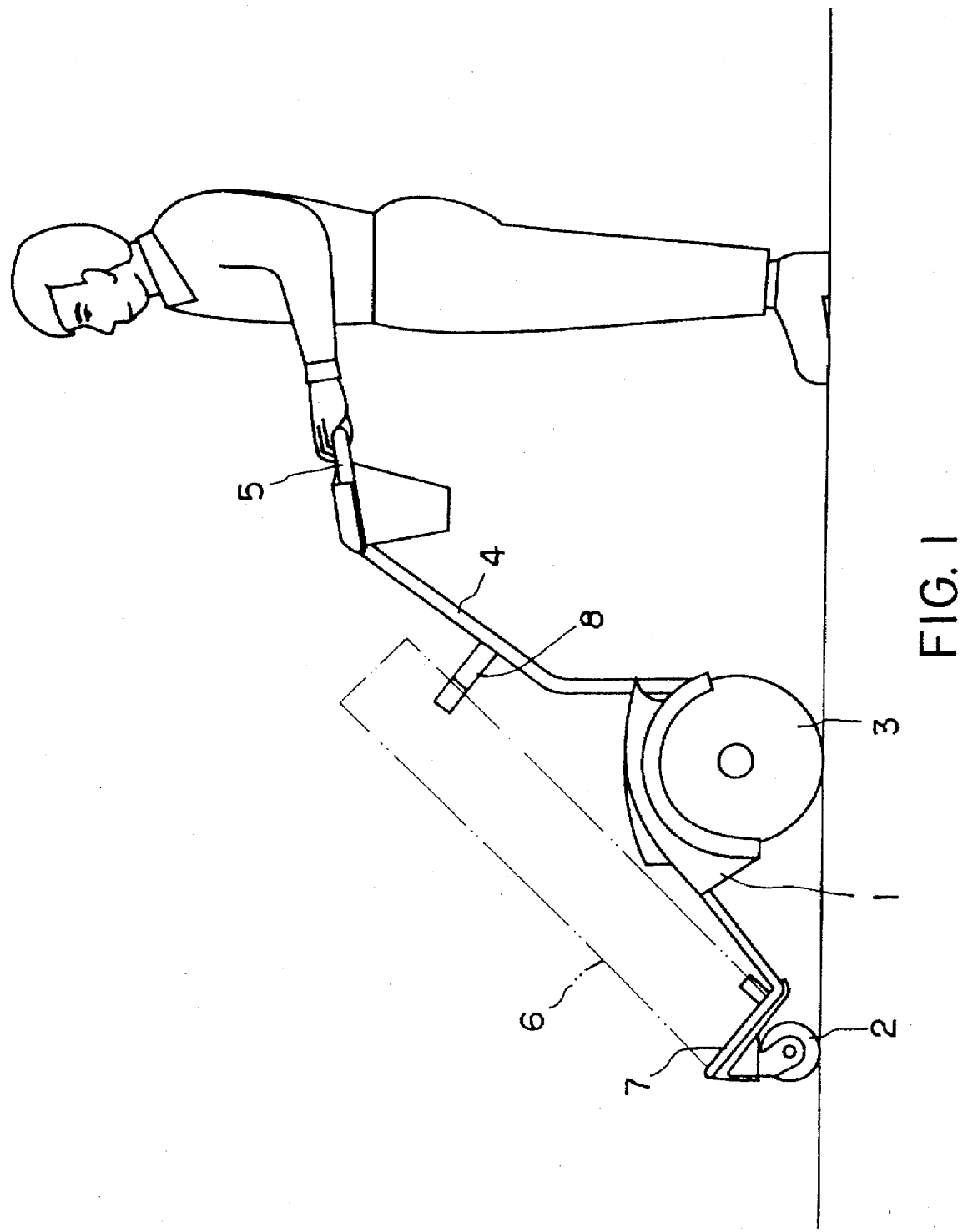
FIG. 1 is a general view showing one example of an electrically driven cart according to the present invention.

FIG. 1 is a schematic side view showing a general construction of the golf cart according to the embodiment.

As shown in FIG. 1, the golf cart of this embodiment is a three-wheeled cart having a body frame 1 which is provided with, as a front wheel, a single free wheel 2 (hereinafter referred to also as a front wheel) capable of changing the moving direction of the cart and, as rear wheels, a pair of left and right wheels 3 (hereinafter referred to also as rear wheels) serving as driving wheels. A support column 4 is vertically extended from an upper rear portion of the body frame 1, and a hand-held pushing handle 5 is provided at an upper end of the support column 4.

A carrier 7 for carrying a golf bag 6 thereon is provided in a front portion of the body frame 1 so that the bottom of the golf bag 6 is rested on the carrier 7 in a rearwardly inclined state. Further, a bag bearing support 8 is provided on the support column 4 to support the golf bag 6 at its upper end portion.

Figure 2:
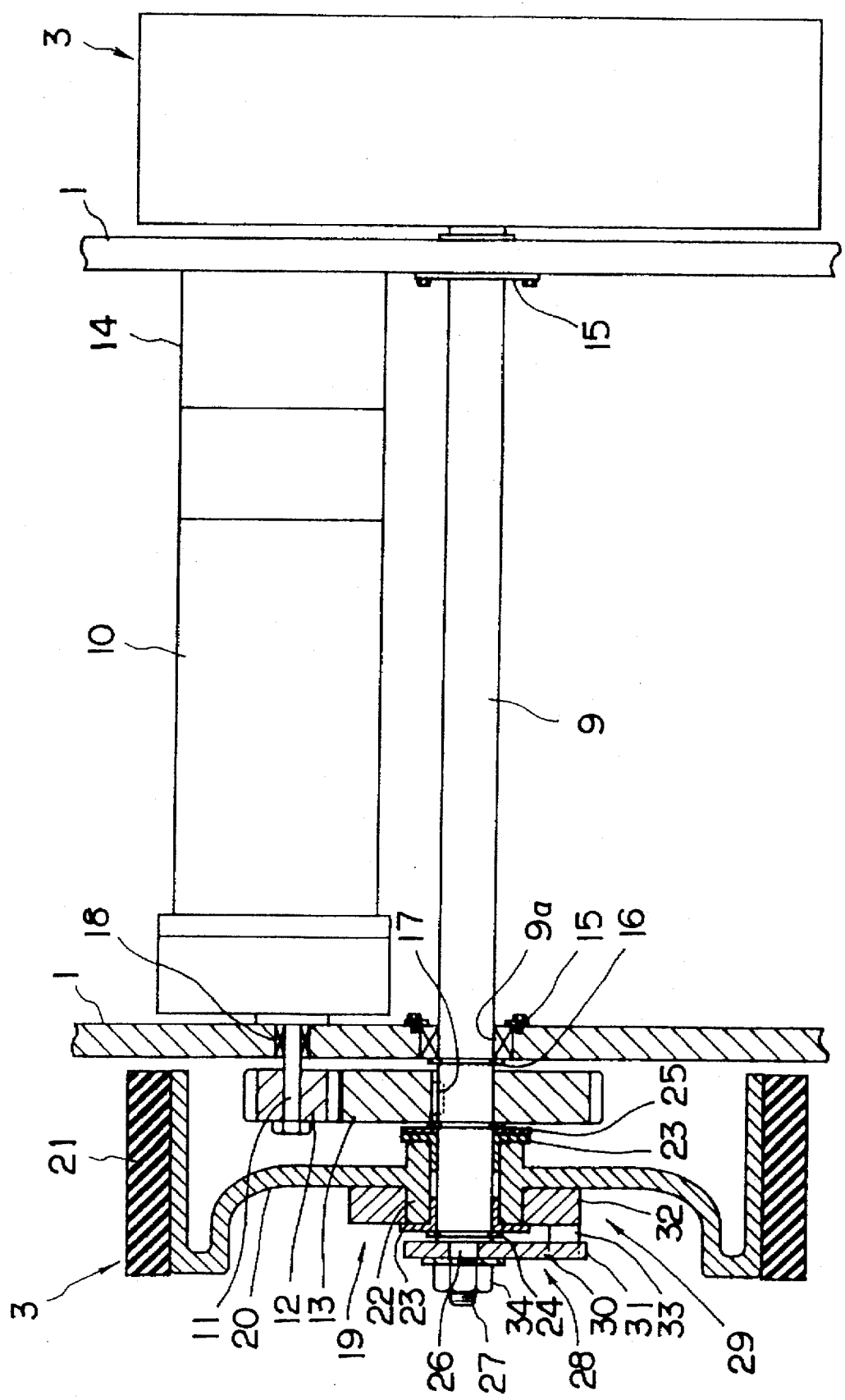
FIG. 2 is an enlarged sectional view of a push type power transmitting mechanism for use in the embodiment.
Figure 3:
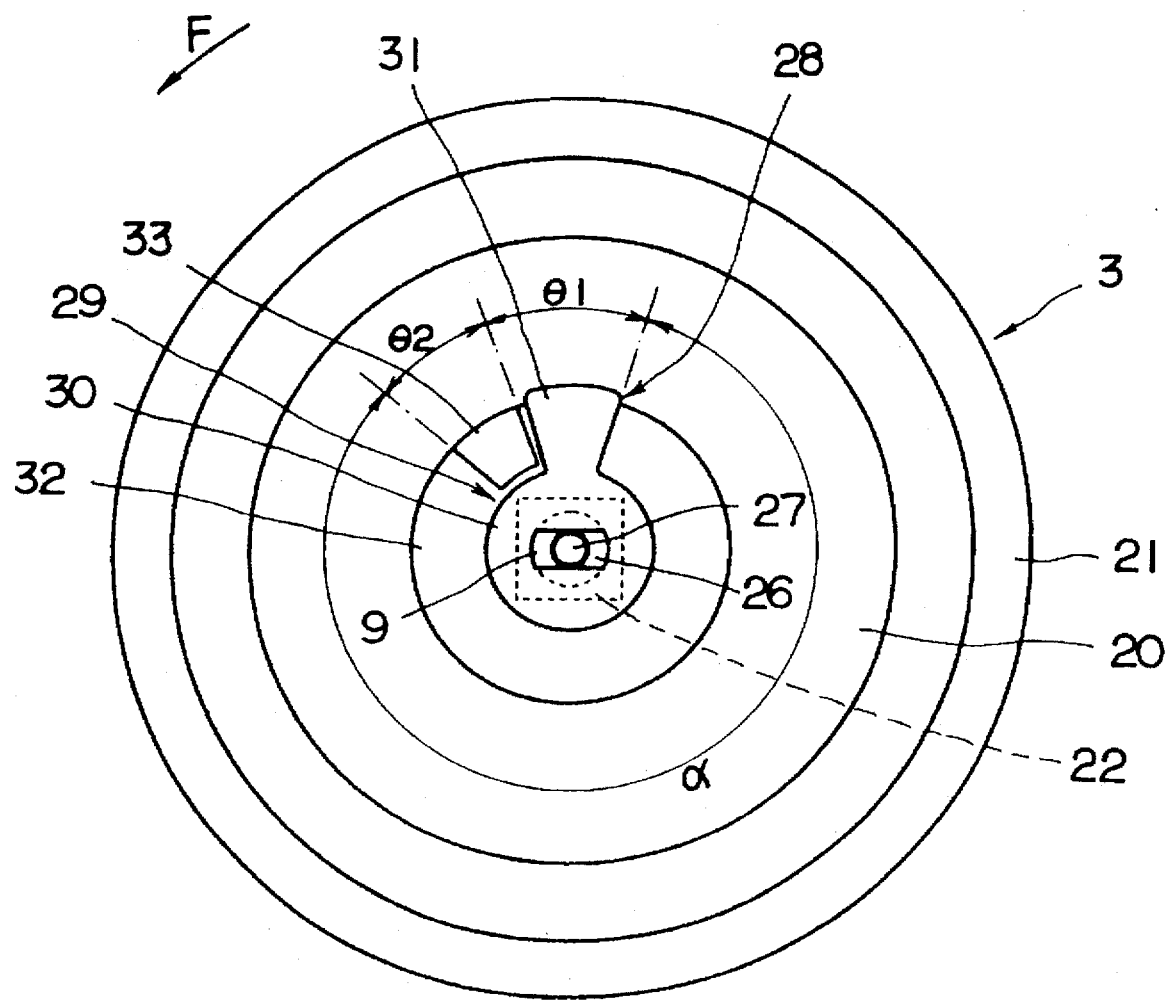
FIG. 3 is a left side view, partly omitted, of the push type power transmitting mechanism shown in FIG. 2.

FIG. 2 is a horizontal sectional view showing the rear wheels and details of a mechanism for driving one of them, and FIG. 3 is a side view, partly omitted, of the rear wheel as viewed from the left side in FIG. 2.

As shown in FIG. 2, a drive shaft 9 for driving the wheels 3 is horizontally supported on the body frame 1 through bearings 9a, and an electric motor 10 as a drive source is fixed to the body frame 1 adjacent to the drive shaft 9. A rotational shaft 11 of the motor 10 is extended parallel to the drive shaft 9. The rotational shaft 11 of the motor 10 and the drive shaft 9 are interconnected to each other through speed reduction gears 12, 13 laterally outside the body frame 1.

A motor brake 14 is associated with the motor 10 in opposed relation to the rotational shaft 11. The motor 10 can be braked by operating a brake switch or the like, not shown, provided on the handle 5 and actuating the motor brake 14. An encoder and a speed controller, both not shown, are associated with the motor brake 14 to detect a rotational speed of the rear wheels 3 and perform speed control, etc.

Additionally, in FIG. 2, engagement rings 15 and 16 are disposed for fixing the bearing 9 for the drive shaft 9 to the body frame 1, and a key 17 for fixing the gear 13 is provided for the drive shaft 9. A bearing 18 for supporting the rotational shaft 11 of the motor 10 is provided for the body frame 1.

In the above arrangements, the rear wheels 3 are rotatably mounted to opposite ends of the drive shaft 9 and torque is transmitted to each of the rear wheels 3 from the drive shaft 9 through a push type power transmitting mechanism 19.

More specifically, the rear wheel 3 has a wide-width configuration and comprises a wheel base 20 having an outer surface curved into a recessed shape and a tire 20 fitted to the wheel base 20. As shown in FIG. 3, a boss 22 provided as one united body with a central portion of the wheel base 20 and having a cylindrical inner periphery and a rectangular outer periphery in cross-section is slidably fitted over an end portion of the drive shaft 9 through bushings 23 so that the rear wheel 3 is rotatably coupled to the drive shaft 9. Incidentally, lock rings 24 and 25 for fixedly positioning the boss 22 of the rear wheel 3 are disposed in the axial direction of the drive shaft 9.

The drive shaft 9 has a pusher fitting portion 26 which is positioned at its extreme end outwardly of the portion fitted to the boss 22 of the rear wheel 3 and is formed to have two parallel planes by cutting its outer peripheral surface in opposed relation, and a fastening bolt 27 projecting as one united body from an axial end of the pusher fitting portion 26. The push type power transmitting mechanism 19 is made up by a pusher 28 fitted with the pusher fitting portion 26 to be rotatable therewith and a receiver 29 fitted with an outer periphery of the boss 22 of the rear wheel 3 to be rotatable therewith.

More specifically, the pusher 28 comprises a ring 30 mounted to the pusher fitting portion 26 to be rotatable therewith, which is formed at each of both ends of the drive shaft 9 and is relatively flat in cross-section, and one pin 31 radially projecting from an outer periphery of the ring 30. The receiver 29 comprises a disk 32 attached to an inner periphery of each of the rear wheels 3 to be rotatable therewith, and a projection 33 projecting from an outer peripheral edge of the disk 32 parallel to the axis of the drive shaft 9 and coming into abutment with the pusher 28 in the circumferential direction. Further, the pusher 28 is fixedly fastened in place by a nut 34 meshed with the bolt 27 at the end of the drive shaft 9, and the receiver 29 is fixedly fitted with the boss 22, having the rectangular outer periphery in cross-section, of the rear wheel 3 by means of the lock ring 24 and so on. The ring 30 and the pin 31 making up the pusher 28 and the disk 32 and the projection 33 making up the receiver 29 are respectively formed through an integral molding process using a hard and light resin, e.g., urethane resin or engineering plastic such as polyamide, polyacetal or polycarbonate.

When the drive shaft 9 is rotated in the direction in which the rear wheels 3 are rotated to advance the cart, as indicated by arrow a in FIG. 3, the pin 31 comes into abutment with the projection 33 on their coaxial circumferential paths, whereupon torque in the forward, i.e. advancing, direction F is transmitted from the drive shaft 9 to the rear wheels 3.

Furthermore, the push type power transmitting mechanism 19 is designed to provide an allowance for rotation of each wheel 3 such that the wheel 3 can rotate in advance of the drive shaft 9 through a certain predetermined angle in the forward direction F. Assuming now that the pin 31 has an angular width θ1 in the circumferential direction and the projection 33 has an angular width θ2, for example, as shown in FIG. 3, the allowance angle α through which the wheel 3 can rotate in advance of the drive shaft 9 in the forward direction F is expressed by 360°−(θ1 +θ2). In the illustrated embodiment, θ1 is set to 45°, θ2 is set to 45° and hence the allowance angle α for the forward rotation of the wheel is set to 270° as one example.

Stated otherwise, with the above setting, when the wheel 3 freely rotates by the certain angle of 270° in the forward direction F, the receiver 29 comes into abutment with the pusher 28 to eliminate the allowance for the forward rotation of the wheel 3 in the illustrated embodiment.

In the thus-arranged golf cart of this embodiment, when advancing the cart to carry the golf bag, the motor 10 is energized through the operation of a control panel, not shown, whereupon rotation of the rotational shaft 11 of the motor 10 is transmitted to the drive shaft 9 through the engagement of the gears 12 and 13. Rotation of the drive shaft 9 is transmitted as a pushing force from the pin 31 of the pusher 28 to the projection 33 of the receiver 29 held in abutment with the pin 31 for each wheel. Hence, the wheels 3 are rotated to advance the cart.

Therefore, the user can easily move the cart by electric power from the motor while gripping the handle 5, as shown in FIG. 1.

When the cart is braked to stop, the motor brake 14 is actuated to stop the rotation of the motor 10. With no torque supplied from the motor 10, the rotation of the drive shaft 9 is stopped and the rotation of the pin 31 of the pusher 28 is also stopped for each wheel. This releases the pushing force acting on the receiver 29, whereupon the wheels 3 are stopped. When an inertial force of the cart body is great, the wheels 3 freely rotate by about one circle (270° in this embodiment) in the forward direction even after the projection 33 of the receiver 29 has separated away from the pin 31. However, since the projection 33 comes then into abutment with the pin 31 in a standstill, the rotation of the wheels 3 is positively stopped.

When traveling on slopes, the cart can easily climb an uphill by rotating the wheels 3 to advance the cart through the push type power transmitting mechanisms 19 as with the normal operation. When descending a downhill, the wheels 3 may rotate in advance of the drive shaft 9 depending on an angle of the slope. In this case, after the wheels 3 have freely rotated through the certain angle in the forward direction, the projection 33 of the receiver 29 of each wheel comes into abutment with the pin 31 of the pusher 28 and, therefore, the receiver 29 attains a braking action based on the decelerating effect as produced by an engine brake. Accordingly, the rotational speed of the wheels 3 will not exceed that of the drive shaft 9.

As a result, safety is sufficiently ensured even while the cart is traveling on the undulated ground.

When stopping the cart, the cart can be well braked by actuating the motor brake 14 associated with the motor 10 as a drive source, and also, when parking the cart on a downhill, the cart can surely be held in a stopped state regardless of the direction of the body, because the projection 33 of the receiver 29 of each wheel comes into abutment with the pin 31 of the pusher 28 on condition that the motor 10 is stopped and the pin 31 of the pusher 28 is thereby stopped.

Next, operation of the wheels during a turn will be described below with reference to FIG. 4.

Figure 4:
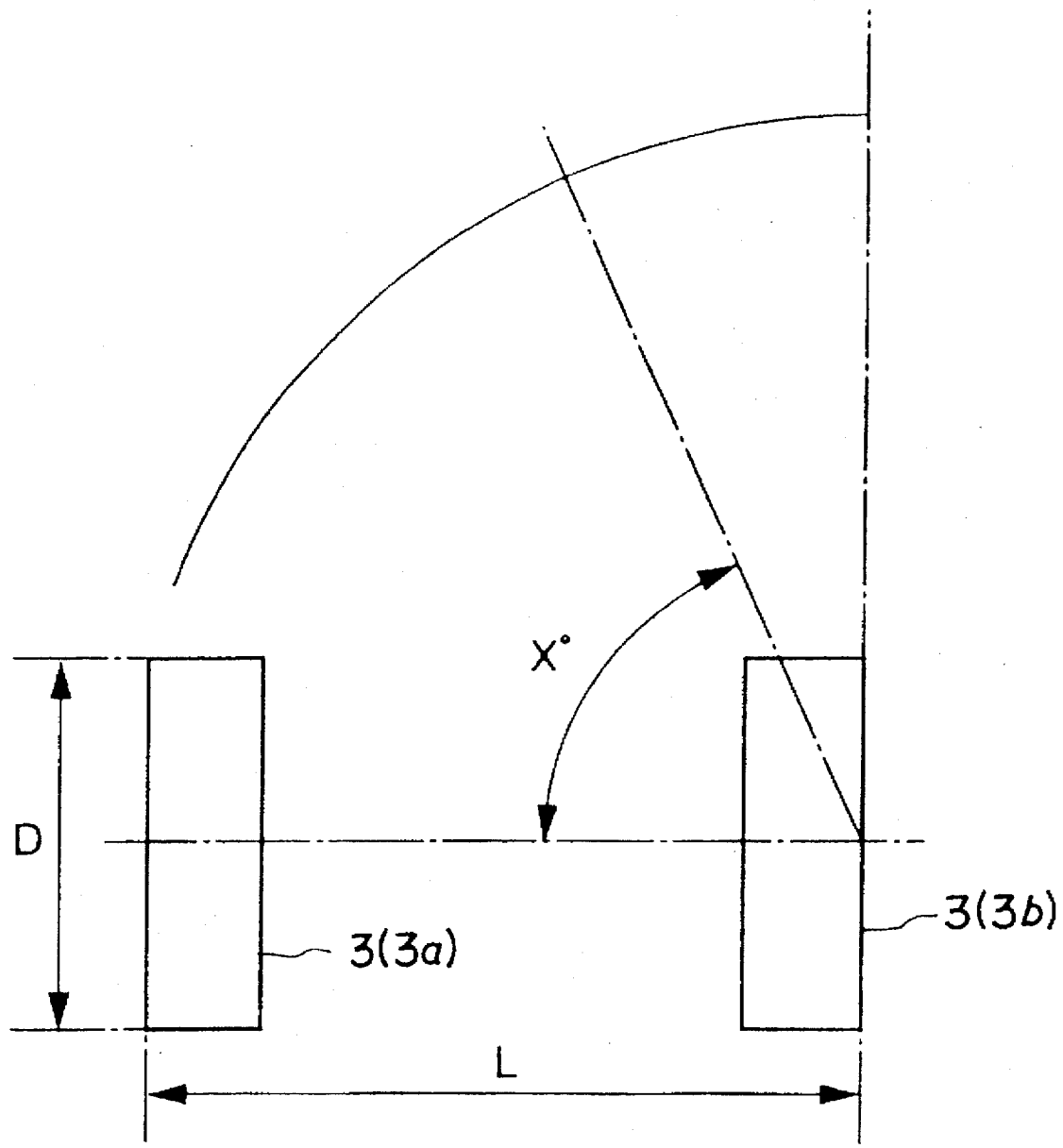
FIG. 4 is a view for explaining operation of the embodiment.

FIG. 4 illustrates a basic angular range where the wheels 3 can turn by differential motion without slipping while the golf cart of this embodiment is making a turn.

When the cart makes a turn for change in its direction, for example, when it makes a right-handed turn as shown in FIG. 4, an outer wheel 3a must rotate in a larger amount than an inner wheel 3b. In this embodiment, within the range from the time when the projection 33 of the receiver 29 starts rotating in advance of the pin 31 of the pusher 28 to the time when it comes into abutment with the pin 31 of the pusher 28 at the opposite side, i.e., the range where the wheel 3a is able to rotate in advance of the drive shaft 9, the wheel 3a can be turned by the differential motion without causing a slip.

Accordingly, as shown in FIG. 4, assuming that the angle through which the outer wheel 3a can rotate to advance with a minimum turn radius on condition that the inner wheel 3b is held in a standstill is X°, the diameter of the wheel 3 is D and the distance between outer surfaces of the wheels is L, by way of example, the following equation will be established:

$$\frac{D \cdot \pi \cdot \alpha/360}{2 \cdot L \cdot \pi} = \frac{X°}{360°} \quad (1)$$

where $\alpha$ is the aforementioned angle through which the receiver 29 can be freely rotated and is given by $\alpha=360°-(\theta_1+\theta_2)$.

From the above equation (1):

$$X° = \frac{D \cdot \alpha}{2 \cdot L} \quad (2)$$

Therefore, in one example in which the diameter D of the wheels 3 is 280 mm, the distance L between outer surfaces of the wheels is 500 mm, and the free rotation angle $\alpha$ is 270°, the turn angle X° covered by the differential motion is 75.6°.

It is assumed in the above example in which the outer wheel 3a turns with the minimum radius while the inner wheel 3b is held in a stopped state. In fact, however, the outer wheel 3a is rotated in advance of the drive shaft 9 while the inner wheel 3b is continuing to rotate. Accordingly, since the actual turn radius is fairly larger than the minimum turn radius, the differential motion turn free from a slip can be achieved in the range of 100° to 150° for the golf cart deigned to satisfy the setting of X°=75.6°.

Incidentally, if the turn angle exceeds the range of 100° to 150° in the same direction (i.e., almost U-turn), the projection 33 on the wheel side catches up the pin 31 on the drive shaft side again and the free state of the outer wheel 3a is lost, resulting in no speed difference between the left and right wheels 3. Thus, the cart changes its moving direction in a forcible manner while causing a slip. However, there is little possibility of such an abrupt change in the direction during normal traveling of the cart. In other words, the cart usually makes a turn by utilizing the speed difference between the left and right wheels 3 as explained in the above.

With the golf cart of the foregoing embodiment, the power transmitting mechanism between the drive shaft 9 and the wheels 3 is of a simple structure comprising the pusher 28 and the receiver 29. This is effective in reducing the number of parts, lessening the body weight, simplifying the control operation, facilitating the manufacture, and hence cutting down the production cost.

In addition, since the power transmitting mechanism allows the driven side to rotate in advance of the drive side in the forward, i.e. advancing, direction for each of the wheels 3, when the cart makes a turn under operation, the outer wheel 3a which must rotate in a larger amount than the inner wheel 3b is allowed to rotate in advance of the drive shaft 9, and the differential motion of the left and right wheels 3a and 3b required for the turn is easily developed.

As a result, the cart can smoothly make a turn without causing a slip between the wheel 3 and the ground. For an electric cart in which an electric power is utilized as an assistive power to advance a handcart, the user can easily change the moving direction of the cart without requiring any extra force. When the electric cart is used as a golf cart traveling on lawns, the differential motion of the wheels 3 enables the cart to smoothly make a turn without causing a slip and, hence, a drawback of damaging the lawns is avoided.

When traveling on slopes, the cart can climb an uphill by rotating the wheels 3 through the push type power transmitting mechanisms 19 as with the normal operation. When descending a downhill, the receivers 29 develop a braking action by the arrangement that, after the wheels 3 have freely rotated through a certain angle in the forward direction, the receiver 29 comes into abutment with the pusher 28 for each wheel to thereby eliminate the allowance for the forward rotation of the wheel. Therefore, safety is sufficiently ensured even while the cart is traveling on the undulated ground, with a simple mechanism such as the motor brake 14 associated with the motor 10 as a drive source. There is no need of providing specific brake mechanisms on the wheels 3. In addition, the foregoing embodiment employs a single motor as the drive source and, hence, only requires a battery of small capacity as the power supply.

While, in the foregoing embodiment, the pusher 28 and the receiver 29 of the push type power transmitting mechanism 19 comprises respectively the pin 31 and the projection 33 both in the convex form, any one of these two members may have the concave form to realize the mechanism 19 through the engagement of convex and concave members.

Furthermore, in the present embodiment, the push type power transmitting mechanism 19 is provided to directly couple the drive shaft 9 and the wheel 3, but it may be provided in another location. For example, the drive shaft may comprise a double pipe and the power transmitting mechanism 19 may be provided to couple an outer pipe and the wheel.

While the pusher 28 and the receiver 29 of the push type power transmitting mechanism 19 are provided in one-to-one relation in the foregoing embodiment, either the pusher or the receiver may be provided two or more. With this modification, the turn angle covered by the differential motion can be set to a larger value.

While the present invention is applied to the handcart in the foregoing embodiment, it is also applicable to a self-propelled cart. Further, the present invention can be likewise applied to various carrying carts other than golf carts, such as a baggage cart, a playing cart, a baby buggy, and a wheeled chair.

While the pusher 28 and the receiver 29 are made of resin in the foregoing embodiment, light metal, e.g., high-tension aluminum, may be used as a material of them.

While the foregoing embodiment is described in connection with a three-wheeled cart having one front wheel and two rear wheels, the push type power transmitting mechanism of the present invention is also applicable to a three-wheeled cart having two front wheels and one rear wheel, or a four-wheeled cart having two front wheels and two rear wheels, the front wheels serving as driving wheels. In a further modification, the front wheel may be eliminated and the cart is provided with only two driving wheels as described in the foregoing embodiment.

Furthermore, in the foregoing embodiment, the power transmitting mechanism between the motor 10 as a drive source and the drive shaft 9 is made up by a gear mechanism comprising the gears 12, 13. However, a power transmitting mechanism comprising pulleys or the like may be used instead.

As fully described hereinabove, according to the electric cart of the present invention, since left and right wheels attached to both ends of a drive shaft rotatable by a driving force from a motor are each driven to rotate through a push type power transmitting mechanism mounted on the drive shaft, the power transmitting mechanism has a simple structure. It is thus possible to effectively reduce the number of parts, lessen the body weight, simplify the control operation, facilitate the manufacture, and hence cut down the production cost.

Still furthermore, according to the present invention, since the power transmitting mechanism allows the driven side to rotate in advance of the drive side in the forward direction for each of the left and right wheels, when the cart makes a turn under operation, the outer wheel which must rotate in a larger amount than the inner wheel is allowed to rotate in advance of the drive shaft, and the differential motion of the left and right wheels required for the turn is easily realized. As a result, the cart can smoothly make a turn without causing a slip between the wheel and the ground. For an electric cart in which electric power is utilized as an assistive power to advance a handcart, the user can easily change the moving direction of the cart without needing any extra force. When the electric cart is used as a golf cart traveling on lawns, the differential motion of the wheels enables the cart to smoothly make a turn without causing a slip and, hence, a drawback of damaging the lawns can be avoided.

When traveling on slopes, the cart can climb an uphill by rotating the wheels through the push type power transmitting mechanisms as with the normal operation. When descending a downhill, the receivers develop a braking action by the arrangement that, after the wheels have freely rotated through a certain angle in the forward direction, the receiver comes into abutment with the pusher for each wheel to thereby eliminate the allowance for the forward rotation of the wheel. Therefore, safety is sufficiently ensured even while the cart is traveling on the undulated ground with a simple mechanism such as the motor brake associated with the motor as a drive source. Thus, there is no need of providing specific brake mechanisms on the wheels. In addition, the cart of the present invention employs a single motor as the drive source and, hence, only requires a battery of small capacity as the power supply.

Accordingly, the present invention can provide an electric cart in which a power transmitting mechanism, including a differential mechanism required for turning of the cart, is relatively simple and easy to manufacture, a reduction in weight, cost and power supply capacity is achieved, and superior operability and safety are ensured.

What is claimed is:

1. An electrically driven cart driven by an electric motor comprising: a body frame;

a driving source comprising the electric motor;

a drive shaft operatively connected to the driving source;

a pair of right and left wheels serving as driving wheels which are operatively coupled to be rotatable to both ends of the drive shaft;

a power transmitting mechanism disposed between the drive shaft and the driving wheels to transmit a power of the motor to the driving wheels through the drive shaft; and a carrier means secured to the body frame on which a baggage is rested, said power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from said pusher, said power transmitting mechanism being provided between said drive shaft and each of said driving wheels, wherein said pusher has a first angular width $\theta1$, said receiver has a second angular width $\theta2$, and said power transmitting mechanism provides an allowance for rotation of each of the driving wheels such that the wheel side can rotate through a certain predetermined angle equal to a maximum angle of $360°-(\theta1+\theta2)$ in advance of the drive shaft side in an advancing direction of the cart.

2. An electrically driven cart according to claim 1, wherein after said wheels have freely rotated through a certain predetermined angle in the advancing direction, said receiver comes into abutment with said pusher for each of the driving wheels to thereby eliminate the allowance for an advancing rotation of the wheel.

3. An electrically driven cart according to claim 1, wherein a ring member is mounted to each of both ends of the drive shaft to be rotatable therewith and the pusher comprises a pin radially projecting from an outer periphery of the ring and wherein a disk is mounted to an inner periphery of each of the wheels to be rotatable therewith and the receiver comprises a projection projecting from an outer peripheral edge of the disk, said projection extending parallel to an axis of the drive shaft and coming into abutment with the pusher in the circumferential direction.

4. An electrically driven cart according to claim 3, wherein said ring and said pin constituting the pusher and said disk and said projection constituting the receiver are respectively formed of a resin material through an integral molding process.

5. An electrically driven cart according to claim 1, wherein said pair of wheels serving as driving rear wheels and a front wheel is further provided to the body frame as a driven wheel to be capable of changing an advancing direction.

6. An electrically driven cart according to claim 1, wherein a rotational shaft extends from the electric motor to be parallel to the drive shaft.

7. An electrically driven cart according to claim 6 wherein the rotational shaft is operatively coupled to the drive shaft through a speed reduction mechanism.

8. An electrically driven cart according to claim 7, wherein the speed reduction mechanism comprises speed changing gear mechanism.

9. An electrically driven cart according to claim 1, further comprising a manually operating handle member attached to the body frame.

10. An electrically driven cart driven by an electric motor for carrying a golf bag comprising:

a body frame;

a driving source comprising the electric motor;

a drive shaft operatively connected to the driving source;

a pair of right and left rear wheels serving as driving wheels which are operatively coupled to be rotatable to both ends of the drive shaft;

a front wheel attached to the body frame serving as a driven wheel to be capable of changing an advancing direction of the cart;

a power transmitting mechanism disposed between the drive shaft and the driving wheels to transmit a power of the motor to the driving wheels through the drive shaft;

a carrier means secured to the body frame on which a golf bag is rested, said carrier means being provided with a support member for supporting the golf bag; and a manually operating handle member attached to the body frame, said power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from said pusher, said power transmitting mechanism being provided between said drive shaft and each of said rear wheels, wherein said pusher has a first angular width θ1, said receiver has a second angular width θ2, and said power transmitting mechanism provides an allowance for rotation of each of the rear wheels such that the rear wheel side can rotate through a certain predetermined angle equal to a maximum angle of 360°−(θ1+θ2) in advance of the drive shaft side in an advancing direction of the cart.

11. An electrically driven cart driven by an electric motor comprising:

a body frame;

a driving source comprising the electric motor;

a drive shaft operatively connected to the driving source;

a pair of right and left wheels serving as driving wheels which are operatively coupled to be rotatable to both ends of the drive shaft;

a power transmitting mechanism disposed between the drive shaft and the driving wheels to transmit a power of the motor to the driving wheels through the drive shaft; and a carrier means secured to the body frame on which a baggage is rested, said power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from said pusher, said power transmitting mechanism being provided between said drive shaft and each of said driving wheels, wherein said power transmitting mechanism provides an allowance for rotation of each of the driving wheels such that the wheel side can rotate through a certain predetermined angle in advance of the drive shaft side in an advancing direction of the cart, and wherein after said wheels have freely rotated through a certain predetermined angle in the advancing direction, said receiver comes into abutment with said pusher for each of the driving wheels to thereby eliminate the allowance for an advancing rotation of the wheel.

12. An electrically driven cart driven by an electric motor comprising:

a body frame;

a driving source comprising the electric motor;

a drive shaft operatively connected to the driving source;

a pair of right and left wheels serving as driving wheels which are operatively coupled to be rotatable to both ends of the drive shaft;

a power transmitting mechanism disposed between the drive shaft and the driving wheels to transmit a power of the motor to the driving wheels through the drive shaft; and a carrier means secured to the body frame on which a baggage is rested, said power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from said pusher, said power transmitting mechanism being provided between said drive shaft and each of said driving wheels, wherein said power transmitting mechanism provides an allowance for rotation of each of the driving wheels such that the wheel side can rotate through a certain predetermined angle in advance of the drive shaft side in an advancing direction of the cart, wherein a ring member is mounted to each of both ends of the drive shaft to be rotatable therewith and the pusher comprises a pin radially projecting from an outer periphery of the ring and wherein a disk is mounted to an inner periphery of each of the wheels to be rotatable therewith and the receiver comprises a projection projecting from an outer peripheral edge of the disk, said projection extending parallel to an axis of the drive shaft and coming into abutment with the pusher in the circumferential direction, and wherein said ring and said pin constituting the pusher and said disk and said projection constituting the receiver are respectively formed of a resin material through an integral molding process.

13. An electrically driven can driven by an electric motor for carrying a golf bag comprising:

a body frame;

a driving source comprising the electric motor;

a drive shaft operatively connected to the driving source;

a pair of right and left rear wheels serving as driving wheels which are operatively coupled to be rotatable to both ends of the drive shaft;

a front wheel attached to the body frame sewing as a driven wheel to be capable of changing an advancing direction of the cart;

a power transmitting mechanism disposed between the drive shaft and the driving wheels to transmit a power of the motor to the driving wheels through the drive shaft;

a carrier means secured to the body frame on which a golf bag is rested, said carrier means being provided with a support member for supporting the golf bag; and a manually operating handle member attached to the body frame, said power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from said pusher, said power transmitting mechanism being provided between said drive shaft and each of said rear wheels, wherein said power transmitting mechanism provides an allowance for rotation of each of the rear wheels such that the rear wheel side can rotate through a certain predetermined angle in advance of the drive shaft side in an advancing direction of the cart, and wherein after said wheels have freely rotated through a certain predetermined angle in the advancing direction, said receiver comes into abutment with said pusher for each of the driving wheels to thereby eliminate the allowance for an advancing rotation of the wheel.

14. An electrically driven cart driven by an electric motor for carrying a golf bag comprising:

a body frame;

a driving source comprising the electric motor;

a drive shaft operatively connected to the driving source;

a pair of right and left rear wheels serving as driving wheels which are operatively coupled to be rotatable to both ends of the drive shaft;

a front wheel attached to the body frame serving as a driven wheel to be capable of changing an advancing direction of the cart;

a power transmitting mechanism disposed between the drive shaft and the driving wheels to transmit a power of the motor to the driving wheels through the drive shaft;

a carrier means secured to the body frame on which a golf bag is rested, said carrier means being provided with a support member for supporting the golf bag; and a manually operating handle member attached to the body frame, said power transmitting mechanism performing a differential motion and comprising a pusher which is provided on the drive shaft to be rotatable therewith and a receiver which is provided on the wheels to be rotatable therewith and comes into abutment with said pusher on their coaxial circumferential paths to receive torque from said pusher, said power transmitting mechanism being provided between said drive shaft and each of said rear wheels, wherein said power transmitting mechanism provides an allowance for rotation of each of the rear wheels such that the rear wheel side can rotate through a certain predetermined angle in advance of the drive shaft side in an advancing direction of the cart, wherein a ring member is mounted to each of both ends of the drive shaft to be rotatable therewith and the pusher comprises a pin radially projecting from an outer periphery of the ring and wherein a disk is mounted to an inner periphery of each of the wheels to be rotatable therewith and the receiver comprises a projection projecting from an outer peripheral edge of the disk, said projection extending parallel to an axis of the drive shaft and coming into abutment with the pusher in the circumferential direction, and wherein said ring and said pin constituting the pusher and said disk and said projection constituting the receiver are respectively formed of a resin material through an integral molding process.

* * * * *

UNITED STATES PATENT AND TRADEMARK OFFICE
CERTIFICATE OF CORRECTION

PATENT NO. : 5,685,385
DATED : November 11, 1997
INVENTOR(S) : Fumio SANUGA

It is certified that error appears in the above-indentified patent and that said Letters Patent is hereby corrected as shown below:

Claim 13, Column 12, Line 39, "can" should read --cart--.

Claim 13, Column 12, Line 48, "sewing" should read --serving--.

Signed and Sealed this

Seventh Day of April, 1998

Attest:

BRUCE LEHMAN

Attesting Officer

Commissioner of Patents and Trademarks